(12) United States Patent
Chen

(10) Patent No.: US 8,218,894 B2
(45) Date of Patent: Jul. 10, 2012

(54) SYSTEM AND METHOD OF CONTRAST ENHANCEMENT

(75) Inventor: Shing-Chia Chen, Tainan (TW)

(73) Assignee: Himax Media Solutions, Inc., Tainan County (TW)

( * ) Notice: Subject to any disclaimer, the term of this patent is extended or adjusted under 35 U.S.C. 154(b) by 561 days.

(21) Appl. No.: 12/557,502

(22) Filed: Sep. 10, 2009

(65) Prior Publication Data

US 2011/0058739 A1    Mar. 10, 2011

(51) Int. Cl.
*G06K 9/40* (2006.01)
(52) U.S. Cl. .................. 382/274; 382/264; 345/617
(58) Field of Classification Search .................. None
See application file for complete search history.

(56) References Cited

U.S. PATENT DOCUMENTS

2005/0110703 A1* 5/2005 Riddle et al. ............ 345/32
2006/0013503 A1* 1/2006 Kim ........................ 382/276

OTHER PUBLICATIONS

Mitra, Sanjit K.; Li, Hui; Lin, Ing-Song; and Yu, Tian-hu, "A New Class of Nonlinear Filters for Image Enhancement", 1991, IEEE, pp. 2525-2528.*

Ji, T.-L.; Sundareshan, M.K.; and Roehrig, H., "Adaptive Image Contrast Enhancement Based on Human Visual Properties", Dec. 1994, IEEE Transactions on Medical Imaging, vol. 13, No. 4, pp. 573-586.*

* cited by examiner

*Primary Examiner* — Jason M Repko
*Assistant Examiner* — Siamak Harandi
(74) *Attorney, Agent, or Firm* — Stout, Uxa, Buyan & Mullins, LLP

(57) ABSTRACT

A system and method of contrast enhancement is disclosed. A contrast enhancement unit processes an input pixel to generate a contrast-enhanced pixel, and a delta unit subtracts the input pixel from the contrast-enhanced pixel, thereby resulting in a difference value. Multiple delayed difference values generated by a delay unit are low-pass filtered to generate a refined difference value. An adding unit adds back the refined difference value to the input pixel, thereby resulting in an output pixel that is contrast-enhanced without noise boost.

12 Claims, 6 Drawing Sheets

SYSTEM AND METHOD OF CONTRAST ENHANCEMENT

BACKGROUND OF THE INVENTION

1. Field of the Invention

The present invention generally relates to image processing, and more particularly to image contrast enhancement without substantial noise boost.

2. Description of the Prior Art

As the image perception of a viewer is commonly more sensitive to contrast than absolute values themselves, contrast enhancement is one of several very important image processes utilized to improve the quality of an image. However, as the image is subjected to contrast enhancement, noise in the original image tends disadvantageously to be amplified or boosted at the same time, as shown in FIG. 1A. This hinders the application of the contrast enhancement process in some situations, such as television signals, where noise is typically present.

In order to relieve this problem, noise reduction is performed prior to the contrast enhancement, as shown in FIG. 1B. Nevertheless, conventional noise reduction not only suppresses the noise but also tends to blur image details, thereby degrading the quality of the image with respect to the image details. Kim discloses in U.S. Patent Application Publication No. 2006/0013503 a method of preventing noise boost and image blur when applying image contrast enhancement, the second figure of which is reproduced herein as FIG. 2 and the entire disclosure of which is hereby incorporated by reference.

Referring to FIG. 2, Kim uses a transform ratio construction block 38 to compute a transform ratio γ as:

$$\gamma(x,y) = f(i(x,y))/i(x,y) \tag{1}$$

where i(x,y) is the (x,y)th pixel value, and f represents a contrast enhancement function constructed in block 34.

The division operation in the expression (1) is performed by a transform ratio construction block 38 or a divider, the implementation of which requires a large gate count or large number of transistors (to implement the divider). As the gate count is one important factor in deciding the overall cost, it is thus impractical to use Kim's transform ratio construction block 38 in products such as consumer electronic products.

Moreover, Kim needs a reserved memory 32 or buffer to compute a locally smoothed transform ratio by low pass filtering the transform ratios of the input pixels in a local window $W_p(x,y)$. The locally smoothed transform ratio out of block 38 is then multiplied with the input pixel i(x,y) from the reserved memory 32. The required use of this reserved memory 32 adds to the overall cost.

For the reason that such a conventional method or system cannot effectively and, more particularly, economically suppress the noise-boost effect when applying contrast enhancement on images, a need has arisen to propose a novel system and method of image contrast enhancement that is not only capable of suppressing noise boost but also can facilitate economic implementation.

SUMMARY OF THE INVENTION

In view of the foregoing, it is an object of the present embodiment to provide a system and method of effectively and economically preventing noise boost in image contrast enhancement.

According to one embodiment, a contrast enhancement unit processes an input pixel with a contrast enhancement function, thereby resulting in (e.g., producing) a contrast-enhanced pixel. A delta unit subtracts the input pixel from the contrast-enhanced pixel, thereby resulting in (e.g., producing) a difference value. A delay unit generates a number of delayed difference values with respect to the difference value. A low-pass filter generates a refined difference value according to the difference value and at least a portion of the delayed difference values. An adding unit adds back the refined difference value to the input pixel, thereby resulting in (e.g., producing) an output pixel.

DETAILED DESCRIPTION OF THE INVENTION

Figure 1A:
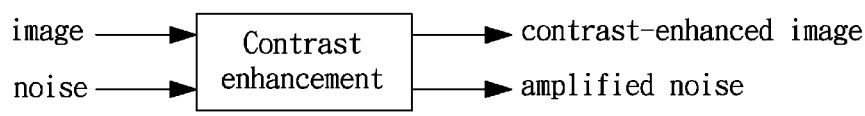
FIG. 1A shows the concept of a conventional contrast enhancement process, where noise is disadvantageously amplified.
Figure 1B:
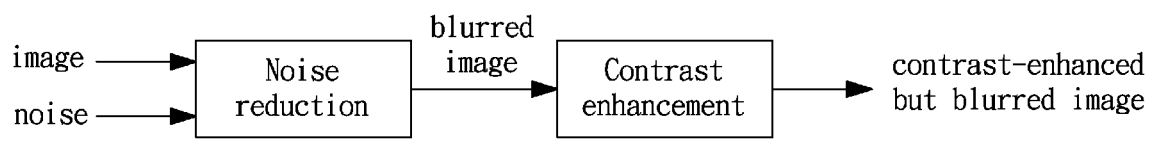
FIG. 1B shows the concept of a conventional contrast enhancement process that is preceded by noise reduction.
Figure 2:
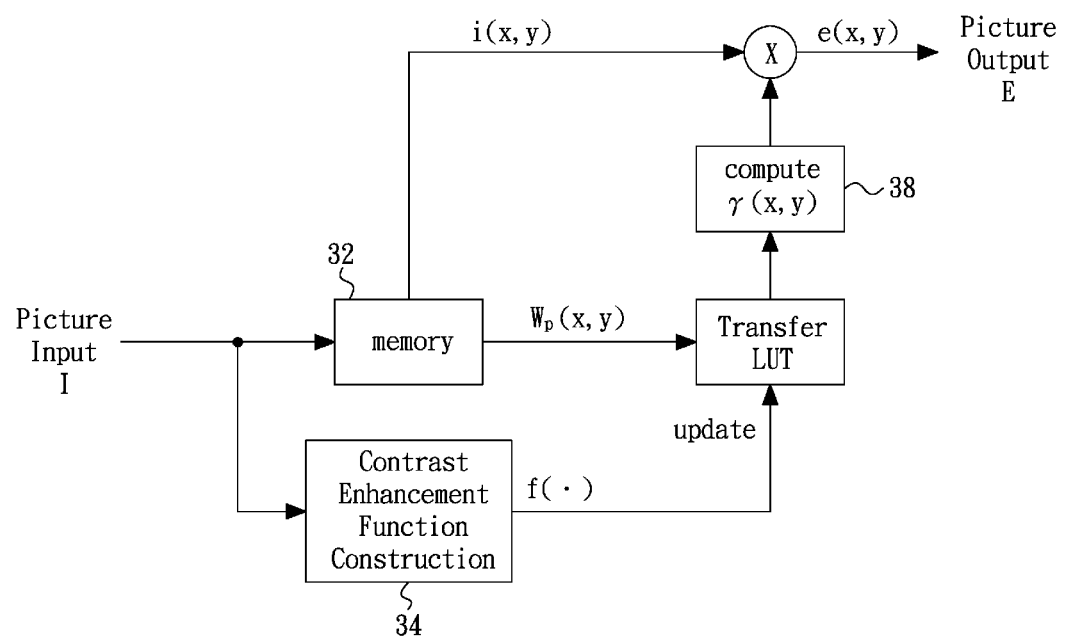
FIG. 2 shows the system disclosed by Kim to suppress the noise-boost effect when applying contrast enhancement on images.
Figure 3:
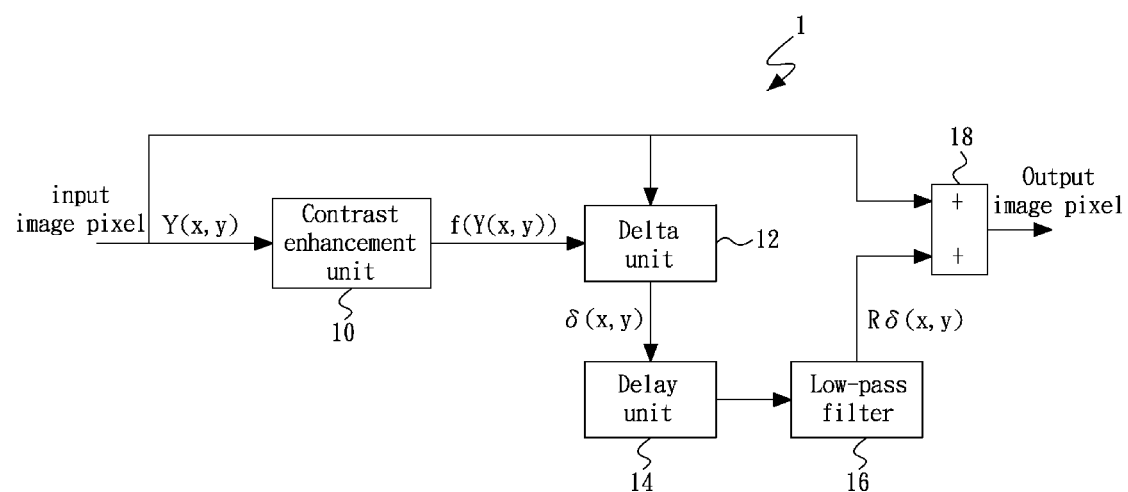
FIG. 3 is a block diagram that illustrates a system of preventing noise boost in image contrast enhancement according to one embodiment of the present invention.
Figure 4:
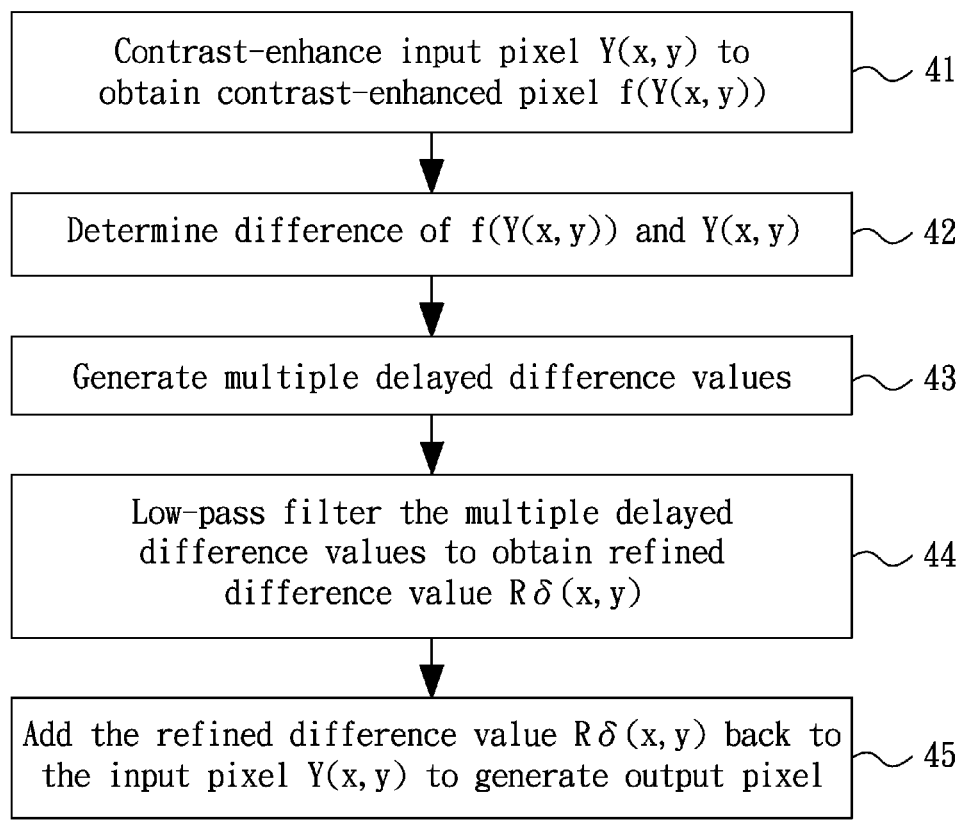
FIG. 4 is a flow diagram that illustrates a method of preventing noise boost in image contrast enhancement according to the embodiment of the present invention.

FIG. 3 is a block diagram that illustrates a system 1 of preventing noise boost in image contrast enhancement according to one embodiment of the present invention, and FIG. 4 is a flow diagram that illustrates a method of preventing noise boost in image contrast enhancement according to the embodiment of the present invention. The term "image" in this specification may generally refer to still pictures, a moving video, or a computer-generated graph. The input image may be an image that is captured, for example, by image sensors, or may be, among other things, another processed image that has been processed by any image processing and/or or an image that is generated by a computer.

Figure 5:
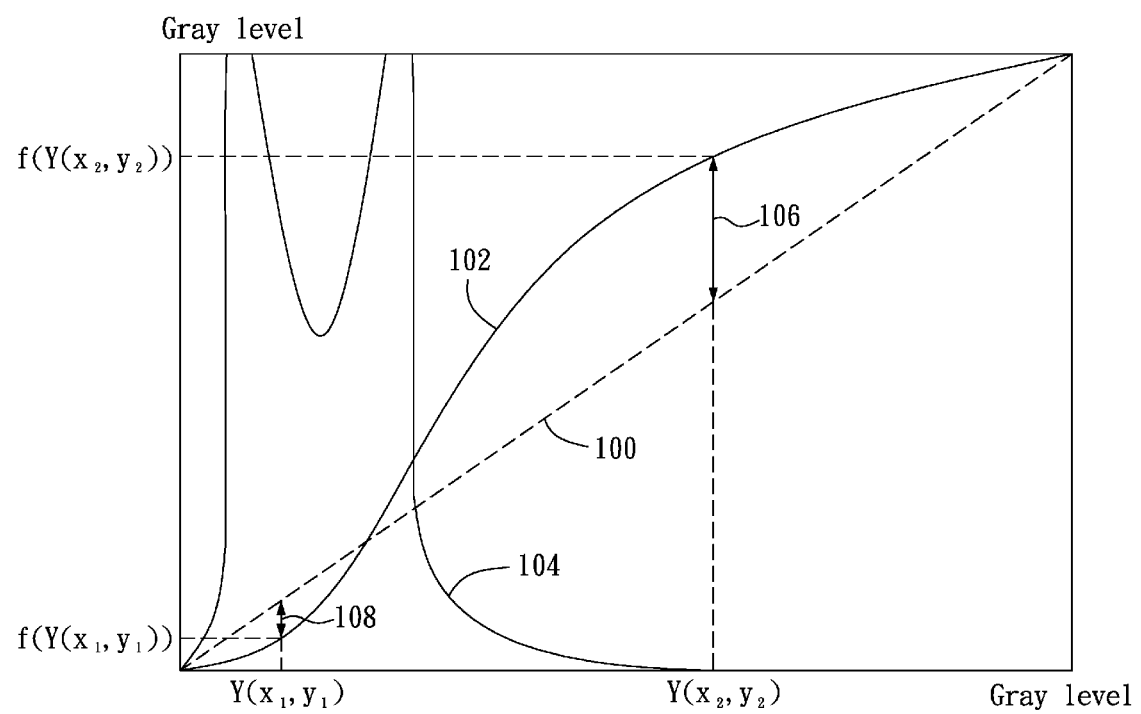
FIG. 5 shows an exemplary transfer curve of the gray-to-gray transfer LUT.

Referring to FIG. 3, an input image pixel (or sample) Y(x,y) is inputted to an image contrast enhancement unit 10 (or, as abbreviated, a contrast enhancement unit), where the notation Y(x,y) represents the (x,y)th pixel value of an input picture Y. The input image pixel is subjected to a contrast enhancement process (step 41) performed by the contrast enhancement unit 10, resulting in an output as the contrast-enhanced image pixel f(Y(x,y)), where f represents the contrast enhancement function provided by the contrast enhancement unit 10. The contrast enhancement function may be a fixed function or an adaptive function. In the embodiment, the contrast enhancement unit 10 may be implemented by a gray-to-gray transfer lookup table (LUT). FIG. 5 shows an exemplary transfer curve 102 (with respect to an original curve 100) of the gray-to-gray transfer LUT, which maps a gray level (e.g., $Y(x_1,y_1)$) to a (contrast-enhanced) gray level (e.g., $f(Y(x_1,y_1))$). Image histogram 104 is also plotted in FIG. 4 to show the number of pixels for each gray level. The transfer curve 102 may be determined according to the image histogram. For example, as most of the gray levels are low-value (or darker) gray levels, the transfer curve 102 thus raises (or enhances) those high-value (or brighter) gray levels with a raising amount 106 while lowers those low-value (or darker) gray levels with a lowering amount 108.

Subsequently, in step 42, the input pixel Y(x,y) is subtracted from the contrast-enhanced pixel f(Y(x,y)) by a delta unit 12, resulting in a difference value or delta δ(x,y):

$$\delta(x,y)=f(Y(x,y))-Y(x,y) \quad (2)$$

Figure 6A:
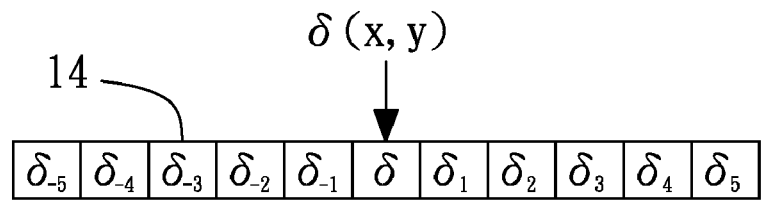
FIG. 6A shows an exemplary delay unit of FIG. 3.

Multiple delayed difference values with respect to the difference value δ(x,y) are generated in step 43 by a delay unit 14. FIG. 6A shows an exemplary delay unit 14, according to the embodiment, that generates multiple delayed difference values with respect to the difference value δ(x,y), that is, $\delta_{-5}(x,y)$, $\delta_{-4}(x,y)$, $\delta_{-3}(x,y)$, $\delta_{-2}(x,y)$, $\delta_{-1}(x,y)$, $\delta_1(x,y)$, $\delta_2(x,y)$, $\delta_3(x,y)$, $\delta_4(x,y)$, and $\delta_5(x,y)$, wherein $\delta_i(x,y)=\delta(x+i,y)$. In more detail, $\delta_{-5}(x,y)$, $\delta_{-4}(x,y)$, $\delta_{-3}(x,y)$, $\delta_{-2}(x,y)$, $\delta_{-1}(x,y)$ are advanced variants of the difference value δ(x,y), and $\delta_1(x,y)$, $\delta_2(x,y)$, $\delta_3(x,y)$, $\delta_4(x,y)$, and $\delta_5(x,y)$ are delayed variants of the difference value δ(x,y). In other words, a one-dimensional (1D) delay unit 14 is used to obtain the multiple advanced and delayed variants of the difference value δ(x,y).

Afterwards, in step 44, the multiple delayed difference values are fed to a low-pass filter 16 to result in a refined (or smoothed) difference value Rδ(x,y). In the embodiment, the low-pass filter 16 may be implemented by, but is not limited to, a one-dimensional (1D) low-pass filtering expressed as follows:

$$R\delta(x,y)=[\delta(x,y)*6+\delta_{-1}(x,y)*5+\delta_{-2}(x,y)*4+\delta_{-3}(x,y)*3+\delta_{-4}(x,y)*2+\delta_{-5}(x,y)*1+\delta_1(x,y)*5+\delta_2(x,y)*4+\delta_3(x,y)*3+\delta_4(x,y)*2+\delta_5(x,y)*1]/36 \quad (3)$$

In general, the refined difference value Rδ(x,y) may be expressed as follows:

$$R\delta(x,y)=[\delta(x,y)*w_0+\delta_{-1}(x,y)*w_{-1}+\delta_{-2}(x,y)*w_{-2}+\ldots+\delta_{-n}(x,y)*w_{-n}+\delta_1(x,y)*w_1+\delta_2(x,y)*w_2+\ldots+\delta_m(x,y)*w_m]/W \quad (4)$$

where $w_{-n}$ to $w_m$ are weightings of the multiple delayed difference values respectively, and W is the sum of the weightings, that is, $W=w_0+w_{-1}+\ldots+w_{-n}+w_1+\ldots+w_m$, with m and n being integers.

Figure 6B:
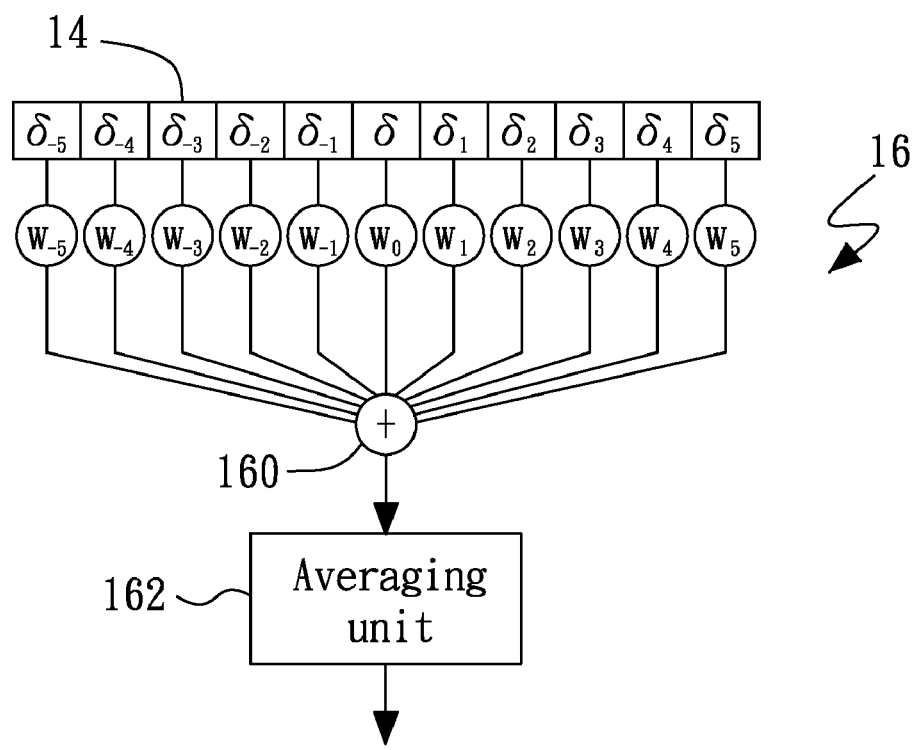
FIG. 6B shows an exemplary low-pass filter of FIG. 3.

The low-pass filtering is also depicted in FIG. 6B, in which an adder 160 is used to add the weighted delayed difference values, and an averaging unit 162 is used to obtain the average of the sum of the weighted delayed difference values as the refined difference value Rδ(x,y).

Finally, in step 45, the refined difference value Rδ(x,y) is added back to the input pixel Y(x,y), for example, by an adding unit 18, therefore resulting in an output pixel or the contrast-enhanced pixel without noise boost.

According to the embodiment, the refined difference value Rδ(x,y) is resistant to the noise that is suppressed by the low-pass filter 16. Compared to the conventional scheme such as that disclosed by Kim as discussed above, the divider is no longer needed in the embodiment of the present invention. Accordingly, the associated gate count or the cost may be substantially decreased. Moreover, compared to the scheme disclosed by Kim, the reserved memory or buffer required for computing the locally smoothed transform ratio is no longer needed in the embodiment of the present invention. Accordingly, further costs may be conserved.

Although specific embodiments have been illustrated and described, it will be appreciated by those skilled in the art that various modifications may be made without departing from the scope of the present invention, which is intended to be limited solely by the appended claims.

What is claimed is:

1. A system for contrast enhancement, comprising:
   a processor configured to implement a contrast enhancement function on an input pixel, thereby resulting in a contrast-enhanced pixel;
   a delta unit configured to subtract the input pixel from the contrast-enhanced pixel, and to produce a difference value;
   a delay unit operable to generate a plurality of delayed difference values with respect to the difference value;
   a low-pass filter arranged to generate a refined difference value according to the difference value and at least a portion of the delayed difference values; and
   an adding unit configured to add back the refined difference value to the input pixel, and having an output to produce an output pixel.

2. The system of claim 1, wherein the contrast enhancement function comprises a gray-to-gray transfer lookup table (LUT) which maps a gray level of the input pixel to another gray level of the contrast-enhanced pixel.

3. The system of claim 2, wherein the gray-to-gray transfer lookup table possesses a transfer curve that is determined according to an image histogram of a plurality of the input pixels.

4. The system of claim 1, wherein the delay unit comprises a one-dimensional delay unit for obtaining the plurality of delayed difference values that include a plurality of delayed variants of the difference value, and a plurality of advanced variants of the difference value.

5. The system of claim 1, wherein the low-pass filter comprises:
   an adder configured to add weighted delayed difference values; and
   an averaging unit arranged to obtain an average of sum of the weighted delayed difference values, thereby resulting in the refined difference value.

6. The system of claim 5, wherein the refined difference value Rδ(x,y) is obtained according to an expression as follows:

$$R\delta(x,y)=[\delta(x,y)*w_0+\delta_{-1}(x,y)*w_{-1}+\delta_{-2}(x,y)*w_{-2}+\ldots+\delta_{-n}(x,y)*w_{-n}+\delta_1(x,y)*w_1+\delta_2(x,y)*w_2+\ldots+\delta_m(x,y)*w_m]/W$$

where $\delta(x,y)$, $\delta_{-1}(x,y)$, ..., $\delta_{-n}(x,y)$, $\delta_1(x,y)$, ..., $\delta_m(x,y)$ are the delayed difference values, $w_{-n}$ to $w_m$ are weightings of the delayed difference values respectively, and W is the sum of the weighted delayed difference values $W=w_0+w_{-1}+\ldots+w_{-n}+w_1+\ldots+w_m$, with m and n being integers.

7. A method for contrast enhancement, comprising:
   processing an input pixel with a contrast enhancement function, thereby resulting in a contrast-enhanced pixel;
   subtracting the input pixel from the contrast-enhanced pixel, thereby resulting in a difference value;
   generating a plurality of delayed difference values with respect to the difference value;
   generating a refined difference value by low-pass filtering according to the difference value and at least a portion of the delayed difference values; and
   adding back the refined difference value to the input pixel, thereby resulting in an output pixel.

8. The method of claim 7, wherein the contrast enhancement function comprises a gray-to-gray transfer lookup table (LUT) which maps a gray level of the input pixel to another gray level of the contrast-enhanced pixel.

9. The method of claim 8, wherein the gray-to-gray transfer lookup table possesses a transfer curve that is determined according to an image histogram of a plurality of the input pixels.

10. The method of claim 7, wherein the step of generating the delayed difference values comprises performing one-dimensional delay for obtaining the plurality of delayed difference values that include a plurality of delayed variants of the difference value, and a plurality of advanced variants of the difference value.

11. The method of claim 7, wherein the low-pass filtering step comprises:
   adding weighted delayed difference values; and
   obtaining an average of sum of the weighted delayed difference values, thereby resulting in the refined difference value.

12. The method of claim 11, wherein the refined difference value $R\delta(x,y)$ is obtained according to an expression as follows:

$$R\delta(x,y)=[\delta(x,y)*w_0+\delta_{-1}(x,y)*w_{-1}+\delta_{-2}(x,y)*w_{-2}+\ldots+\delta_{-n}(x,y)*w_{-n}+\delta_1(x,y)*w_1+\delta_2(x,y)*w_2+\ldots+\delta_m(x,y)*w_m]/W$$

where $\delta(x,y), \delta_{-1}(x,y), \ldots, \delta_{-n}(x,y), \delta_1(x,y), \ldots, \delta_m(x,y)$ are the delayed difference values, $w_{-n}$ to $w_m$ are weightings of the delayed difference values respectively, and W is the sum of the weighted delayed difference values $W=w_0+w_{-1}+\ldots+w_{-n}+w_1+\ldots+w_m$, with m and n being integers.

* * * * *